Figure 1:
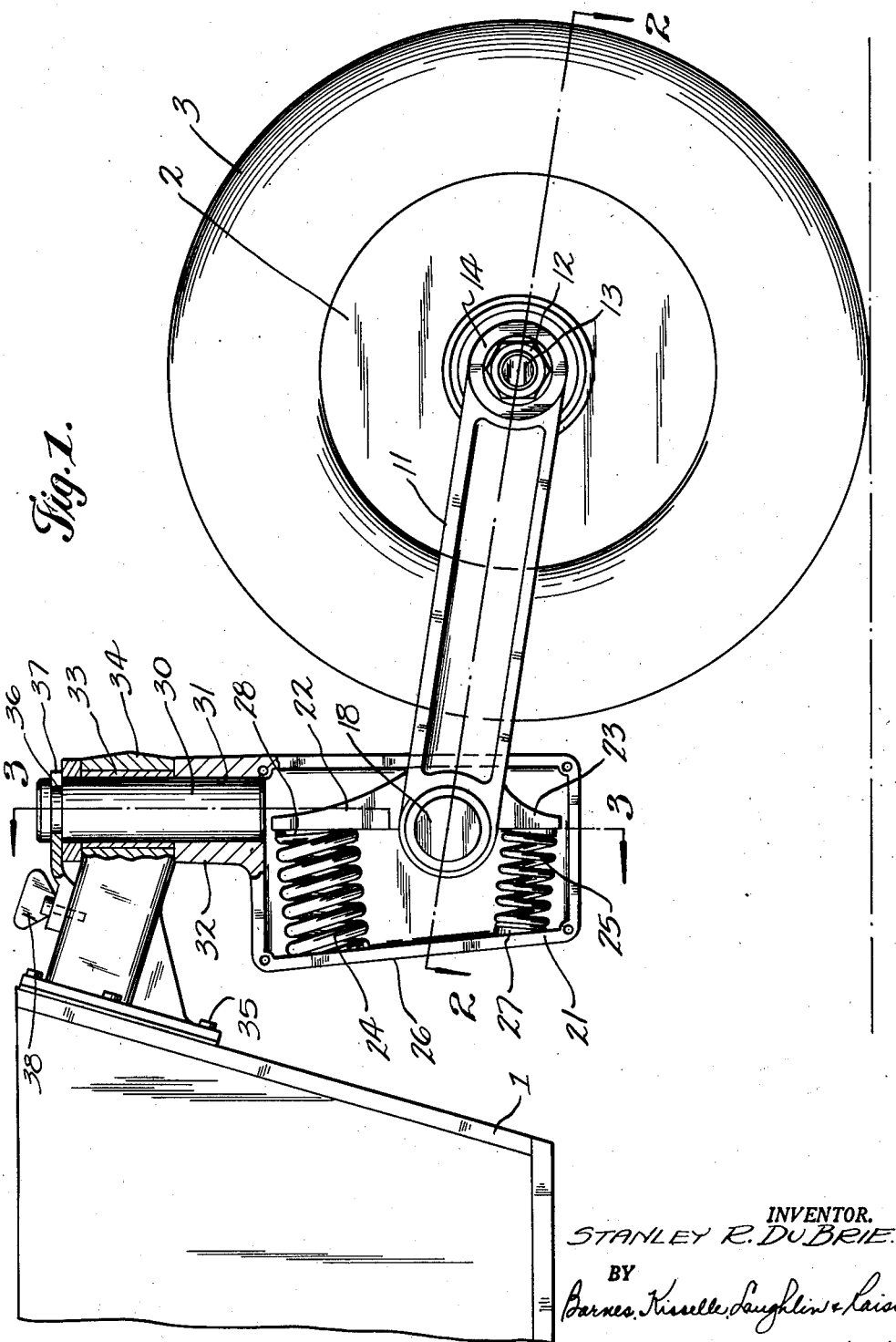

May 24, 1949.　　　S. R. DU BRIE　　　2,470,978
TRAILER CASTER
Filed Sept. 21, 1946　　　2 Sheets-Sheet 1

INVENTOR.
STANLEY R. DU BRIE.
BY
Barnes, Kisselle, Laughlin & Raisch
ATTORNEYS.

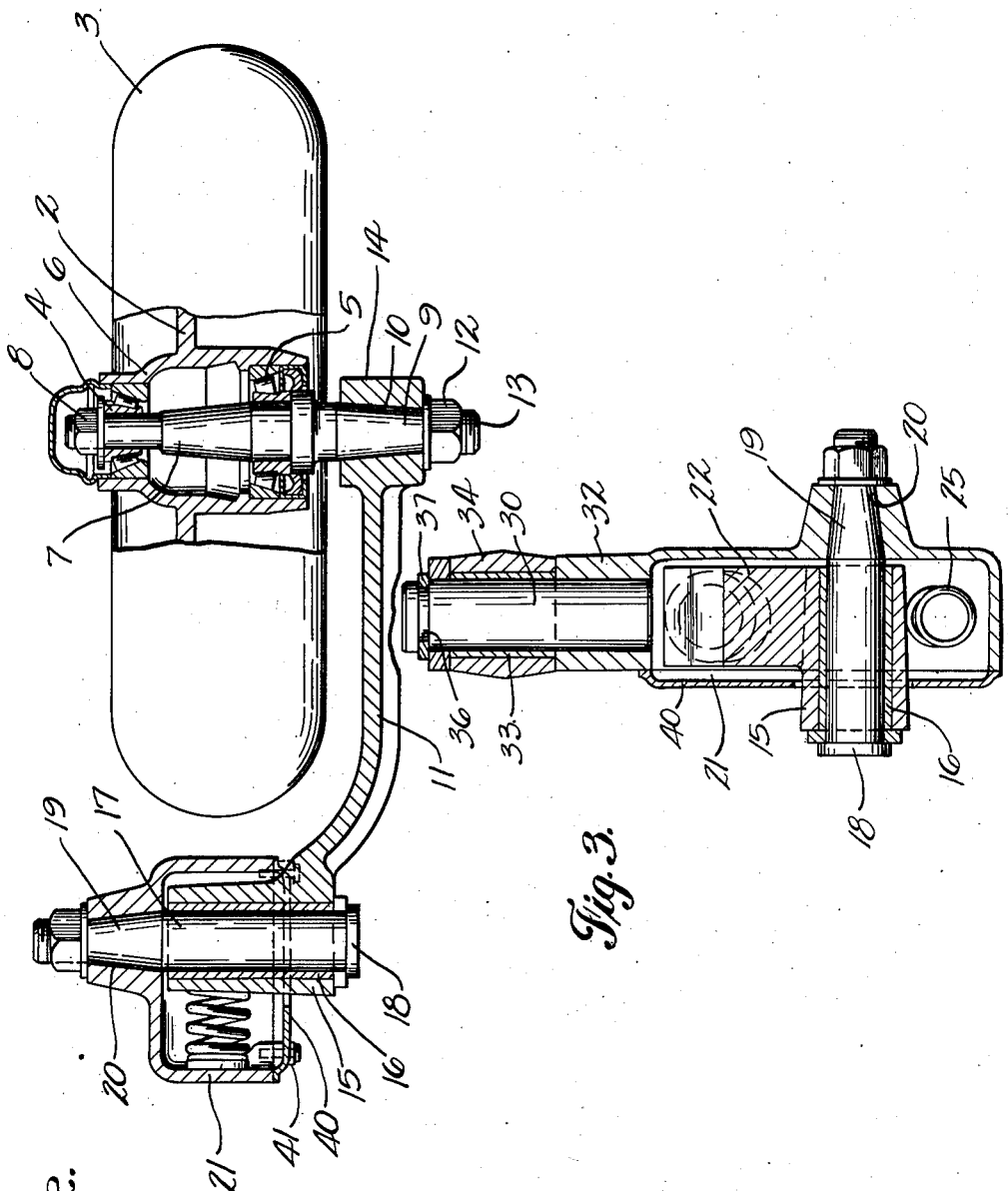

Patented May 24, 1949

2,470,978

UNITED STATES PATENT OFFICE 2,470,978

TRAILER CASTER

Stanley R. Du Brie, Detroit, Mich., assignor to Detroit Engineering Laboratories, Inc., Detroit, Mich., a corporation of Michigan Application September 21, 1946, Serial No. 698,536

6 Claims. (Cl. 16—44)

This invention relates to a trailer caster.

It is an object of this invention to produce a trailer caster which is efficient in operation, of simple structure, rugged, and arranged so that the pneumatic tire and wheel can be readily serviced in place or removed from the axle.

Fig. 1 is a side elevation showing my caster wheel supporting the rear end of a portable trailer boat.

Figs. 2 and 3 are sections along the lines 2—2 and 3—3 of Fig. 1 respectively.

Referring more particularly to the drawings, I have shown my caster wheel attached to a portable trailer boat 1 for supporting the same. My caster comprises a wheel 2, preferably of steel, upon which is mounted a pneumatic tire 3. Wheel 2 is supported by means of roller bearings 4 and 5 within wheel hub 6 upon axle 7. Wheel 2 is retained upon axle 7 conventionally by a nut 8 screwed upon the threaded end of axle 7. The other end of axle 7 is tapered as at 9 and fits into a tapered opening 10 in the rear end 14 of support arm 11. Axle 7 is retained in position by nut 12 screwed upon the other threaded end 13 of axle 7.

The front end of arm 11 is in the form of a sleeve 15 provided with a bearing 16 which is journalled upon pin 17 and retained thereon by the enlarged head 18 of pin 17. Pin 17 is provided with a tapered end 19 which fits tightly in correspondingly tapered socket 20 of housing 21.

The front end of arm 11 is provided with upper and lower projections 22 and 23, respectively, which provide seats for the ends of compression springs 24 and 25, respectively. The other ends of springs 24 and 25 are seated against the front face 26 of housing 21. Front face 26 of housing 21 is provided with inwardly projecting short posts 27 and seats 22 and 23 are similarly provided with inwardly projecting short posts 28 over which springs 24 and 25 seat and are thereby held in place.

A cylindrical post 30 has a press fit as at 31 in the upper bearing end 32 of housing 21. Pin 30 is arranged to be slipped into and journalled in a cylindrical bearing opening 33 in bracket 34 which is secured to boat 1 by bolts 35. Post 30 is provided with a circumferential groove 36 adjacent its upper end into which fits a bifurcated retainer 37 which is secured to bracket 34 by a wing screw 38. When wing screw 38 is removed, retainer 37 can be slipped out of groove 36 and post 30 slipped out of journal 33 to thereby disconnect the castor from the trailer boat.

Spring 24 is a heavier and stronger spring than spring 25 because spring 24 carries the load whereas spring 25 merely acts as a snubber or recoil shock absorber.

It will be noted that pneumatic tire wheel 2 is supported upon a single pivoted arm 11 rather than upon a fork. Thus, tire 3 can be readily removed from, or placed upon, wheel 2 without taking the wheel off of axle 7.

The open side of housing 21 is preferably closed by plate 40 which is retained thereon by screws 41.

I claim:

1. In a caster assembly of the type comprising a support arm having a wheel journalled on an axle at the rear end of said support arm and a horizontal pivotal support for the front end of said support arm, means for controlling the pivotal movement of said support arm comprising a pair of diametrically opposed seats mounted on the front end of said arm above and below the pivotal support for the front end of said support arm, a coil spring mounted on the upper seat for carrying the load imposed on said wheel and a coil spring mounted on the lower seat and adapted to serve as a shock absorber, said springs extending forwardly from said seats beyond the front end of said support arm.

2. In a caster assembly of the type comprising a support arm having a wheel journalled on an axle at the rear end of said support arm and a horizontal pivotal support for the front end of said support arm, means for controlling the pivotal movement of said support arm comprising a pair of seats mounted at the front end of said support arm on opposite sides of said pivotal support, said seats both facing in substantially the same direction relative to said support arm, a backing member extending across said seats in spaced relation thereto, and a pair of coil springs mounted on said seats and backed against said backing member.

3. In a caster assembly of the type comprising a support arm having a wheel journalled on an axle at the rear end of said support arm and a horizontal pivotal support for the front end of said support arm, means for controlling the pivotal movement of said support arm comprising a pair of seats mounted at the front end of said support arm on opposite sides of said pivotal support, a pair of coil springs mounted on said seats, one of said coil springs serving to support the load imposed on said wheel and the other serving as a snubber when the load on said wheel is removed or decreased, both of said springs extending from said seats in substantially the same direction, and a support spaced from said seats for backing up said springs.

4. In a caster assembly of the type comprising a support arm having a wheel journalled on an axle at the rear end of said support arm and a horizontal pivotal support for the front end of said support arm, means for controlling the pivotal movement of said support arm comprising a cross arm fixed at the front end of said support arm, a pair of seats on said cross arm, said seats facing in substantially the same direction and being disposed on opposite sides of the pivotal support for the front end of the support arm, and a pair of coil springs mounted on said seats and extending from said seats in substantially the same direction.

5. In a caster assembly of the type comprising a support arm having a wheel journalled on an axle at the rear end of said support arm and a horizontal front axle for supporting the front end of said support arm, means for controlling the pivotal movement of said support arm comprising a pair of seats mounted on the front end of said support arm on opposite sides of said front axle, a pair of coil springs mounted on said seats, and a housing for supporting said front axle and for enclosing said coil springs, said coil springs reacting between a wall of said housing and their respective seats.

6. In a caster assembly of the type comprising a support arm having a wheel journalled on an axle at the rear end of said support arm and a horizontal front axle for supporting the front end of said support arm, means for controlling the pivotal movement of said support arm comprising upper and lower seats mounted at the front end of said support arm and positioned above and below said front axle, a pair of coil springs mounted on said seats and a housing for supporting said front axle and for enclosing said coil springs, said coil springs extending forwardly from said seats and being backed at their forward end against a wall of said housing.

STANLEY R. DU BRIE.

REFERENCES CITED

The following references are of record in the file of this patent:

UNITED STATES PATENTS

| Number | Name | Date |
|---|---|---|
| 1,177,237 | Egan | Mar. 28, 1916 |
| 2,087,299 | Pribil | July 20, 1937 |
| 2,163,850 | Pfister | June 27, 1939 |
| 2,271,304 | Mulholland | Jan. 27, 1942 |
| 2,282,506 | Wachter | May 12, 1942 |

FOREIGN PATENTS

| Number | Country | Date |
|---|---|---|
| 523,115 | Great Britain | July 5, 1940 |